Jan. 12, 1937.  J. B. RICKETTS, JR  2,067,545
PNEUMATIC TIRE ASSEMBLY
Filed Sept. 24, 1935
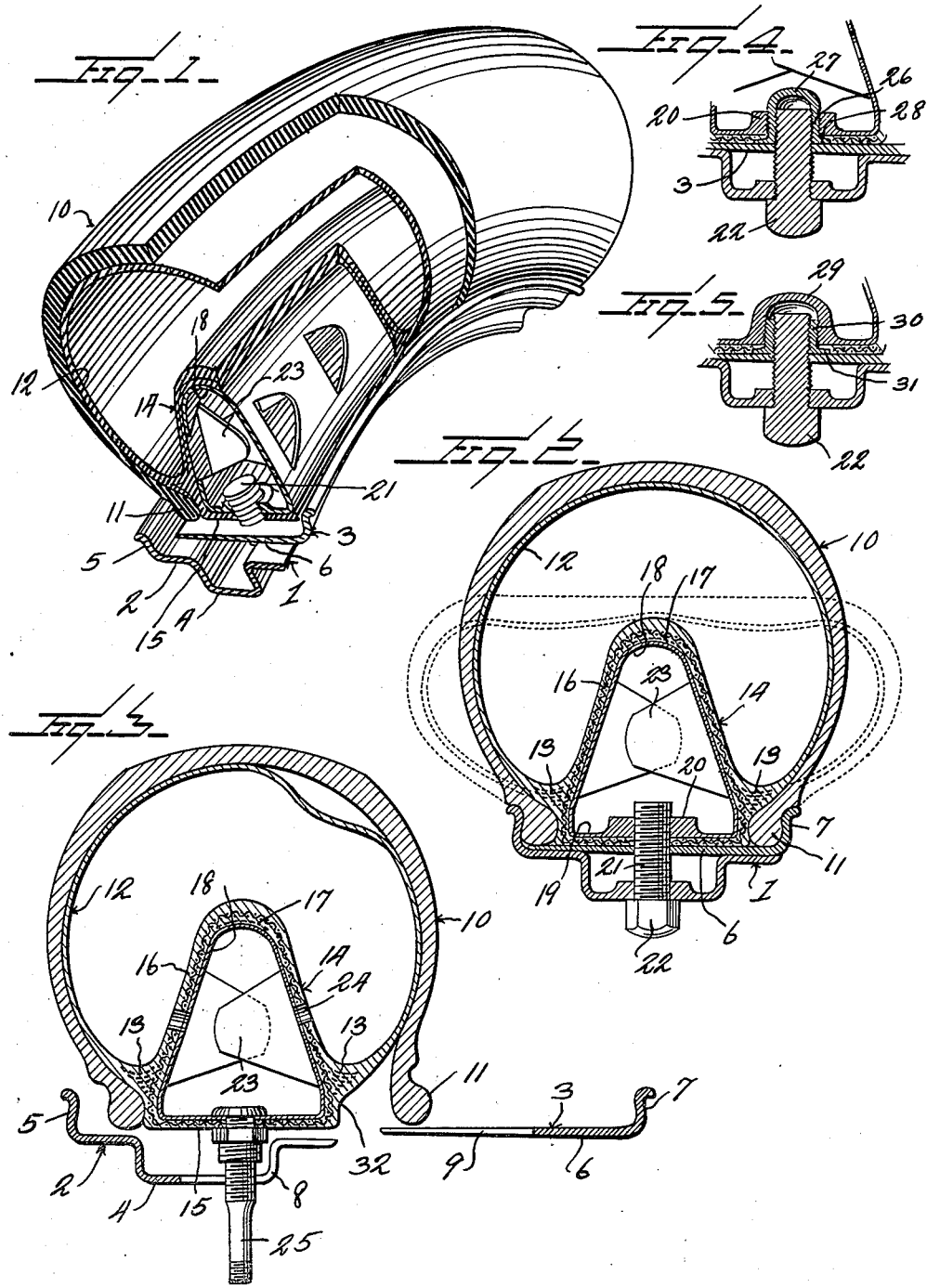
INVENTOR
J. B. Ricketts, Jr.
Watson E. Coleman
ATTORNEY Patented Jan. 12, 1937

2,067,545

UNITED STATES PATENT OFFICE 2,067,545

PNEUMATIC TIRE ASSEMBLY

John B. Ricketts, Jr., Lomita Park, San Bruno, Calif.

Application September 24, 1935, Serial No. 41,938

13 Claims. (Cl. 152—22)

This invention relates to the class of pneumatic tires and rims, and pertains particularly to an improved safety inner tube and supporting rim therefor.

The primary object of the present invention is to provide a new and novel type of pneumatic tire inner tube structure designed to overcome the dangers incident to blowouts, by providing an auxiliary supporting means which will prevent the excessive dropping or lowering of the side of the car upon which the blowout occurs.

Another object of the invention is to provide a pneumatic tire inner tube which in addition to being designed to provide an auxiliary supporting means in the event of the puncture or bursting of the inner tube, provides a substantial support which will permit running of the car upon the deflated tire without damaging the tire.

A still further object of the invention is to provide an improved pneumatic tire inner tube having a rigid center structure of light but strong design, which is capable of supporting the weight of a vehicle for a reasonable period of time without damaging the tire whereby the operator of the vehicle is enabled to run the same to some place where the damage to the tube can be remedied or the same replaced.

Another object of the invention is to provide an improved type of vehicle wheel rim whereby the application of a pneumatic tire to the wheel is facilitated and whereby the tire is held in place without depending upon its being in inflated condition to be so held.

The invention will be best understood from a consideration of the following detail description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in perspective of a portion of the tire, inner tube, and wheel rim structure embodying the present invention.

Fig. 2 is a view in cross section of the same showing in dotted outline the position assumed by the tire casing when the tube has been punctured.

Fig. 3 is a transverse sectional view similar to Fig. 2, but showing the valve unit of the inner tube and showing the manner in which the two-part casing supporting rim is assembled.

Fig. 4 is a detailed sectional view of a modified form of the means for coupling the inner tube with the wheel rim.

Fig. 5 is a detailed sectional view of a further modified form of the means employed for coupling the tube to the rim.

Referring now more particularly to the drawing wherein like numerals of reference indicate corresponding parts throughout the several views, the numeral 1 designates generally the rim structure embodying the present invention, and as shown, this is made up of two portions 2 and 3. The portions 2 and 3 of the rim are of annular design and the portion 2 comprises a central channeled part 4 which merges into a laterally upstanding flange 5 at one side, while at its other side it extend laterally in a plane at right angles to the flange 5, as is clearly illustrated in Fig. 3. The portion 3 of the rim comprises a flat band 6 having an angularly outwardly directed flange 7 at one edge and tapering to a relatively thin condition toward its other edge. This wedge-shaped portion 3 of the rim is adapted to encircle the portion 2 of the rim, as illustrated in Fig. 2, and the two parts of the rim are provided at adjacent points with complemental transversely extending recesses 8 and 9 to receive the inner tube valve hereinafter referred to.

The tire casing is indicated by the numeral 10 and this is provided along each edge with a bead 11 which engages one of the flanges of the rim when the latter is assembled with the tire thereon.

The inner tube is indicated generally by the numeral 12. The sides of this tube merge into the thickened fabric reinforced areas 13 which join the sides of an annular central unit forming an integral part of the tube, and indicated generally by the numeral 14. This annular unit 14 is substantially triangular in cross section and its base portion 15 with which the thickened parts 13 of the tube merge, rests against the part 3 of the rim when the tube is in use.

The annular structure 14 is reinforced throughout by fabric inserts 16 and these are preferably multiplied across the apex portion of the body and this portion is also made materially thicker than the side walls as indicated at 17 in Figs. 2 and 3. The portion 14 of the tube is formed over and vulcanized to a steel or other suitable metallic material frame 18 which is also triangular in cross-section and tubular as shown. This steel frame is provided at intervals throughout its base area 19 with the thickened portions 20 through which threaded openings are formed which coincide with similar openings in the two parts of the rim. The base portion 15 of the part 14 of the tube is also apertured at these points so as to permit the extension through the two rim parts of the threaded shank 21 of a bolt 22 which engages the thickened portion 20 and is employed to give attachment additional to that afforded by rim portions 2 and 3 and base 15 of the inner tube.

The side walls of the annular frame 18 are provided at relatively close intervals with instruck wings 23, and those upon one side of the frame are placed in overlapping relation with those upon the opposite side and welded together so that these wings form a reinforcing for the frame to prevent the collapse of the side walls thereof. The wall of the frame 18 and the sides of the portion 14 of the tube may have one or more apertures 24 formed therethrough to permit the air which is introduced through the valve 25 into the interior of the frame 18 to enter the tube.

While with the means shown in Figs. 1 and 2 for coupling the parts of the rim together, leakage of the air from the tube may be prevented, there is a possibility of some air escaping, therefore the means illustrated in Figs. 4 and 5 have been devised for preventing this condition from developing.

In the construction illustrated in Fig. 4 there is provided a cap-like cylinder body 26 which is closed at one end, as indicated at 27, and which has the lateral surrounding flange 28 at its opposite end. This cap body is interiorly and exteriorly threaded and is threaded into the thickened portion 20 of the annular frame 18 so as to bring the flange 28 firmly into contact with the underside of the rubberized portion 15 of the central body of the tube. The rubberized portion 15 of the tube which lies between the flange 28 and the base of the frame 18 will thus serve as a seal to prevent the escape of air from the interior of the tube. In the structure illustrated in Fig. 5 for preventing leakage, the thickened area of the frame 18 which is indicated by the numeral 20 in Fig. 4, is extended inwardly and carried across the inner end of the threaded passage which is formed therethrough, thus forming a dome 29 which closes the inner end of the passage. An interiorly and exteriorly threaded sleeve 30 having a flange 31 at one end is then threaded into the passage so as to bring the flanged portion against the rubberized fabric of the part 15 of the tube to utilize the same as a sealing means in the same manner as described in connection with the flange 28. The threaded end of the bolt 22 will then engage in the sleeve 30.

From the foregoing it will be readily apparent that the structure of the inner tube which is made up of the parts 14 and 18 and which may be referred to or described as a buffer, will provide a rigid rim-like unit which will take on the duty of the air-filled tire and tube when the latter becomes punctured and the supporting air escapes. By constructing the annular frame 18 of sheet metal in the manner described, it has all the strength of a solid body without the weight which such a body would have, and by providing the apex portion of the rubberized fabric of the part 14 relatively thick in the manner illustrated, no damage will be done to the tube or rim if the car upon which the tire is placed is run at a reasonable speed after the air has escaped from the tube.

It will be apparent that the larger portion 2 of the rim structure will be carried by the spokes of the vehicle wheel and the smaller portion 3 will be removable for the changing of the tire. By merging the tube with the sides of the triangular central portion 14 thereof at points inwardly of the edge of the base 15, an inset area is formed, as indicated at 32, to receive a bead 11 of the tire. Thus when the tire with the tube already in place therein, is slipped onto the portion 2 of the rim and the removable rim portion 3 is slid in between the portion 2 and the part 15 of the tube, the beads 11 of the casing will be forced into the areas 32 and held in place between the same and the flanges 5 and 7. Thus it will be apparent that the maintenance of the tire casing upon the rim is not dependent upon keeping the tire expanded by the air in the tube, and if the tube becomes punctured and the air escapes, the vehicle can be run upon the buffer which forms a part of the tube structure and the casing cannot become loose from the rim.

The rim portion 3 may be cut transversely at any suitable point to permit expansion in a radial direction. This will facilitate the easy application of this portion of the rim to the portion 2 and the parts will be readily locked together against displacement by the bolts 22 which pass therethrough.

What is claimed, is:

1. A pneumatic tire assembly, comprising a rim adapted for application to a wheel, a tire casing on said rim, an inner tube in the casing having an integral metallically reinforced portion extending circumferentially throughout the inner side, which portion contacts with the rim, and securing elements passing thru the rim and said portion and coupling with the metallic reinforcement to fix the tube firmly in relation with the rim.

2. A pneumatic tire assembly, comprising a rim adapted for application to a wheel, a tire casing on said rim, an inner tube in the casing having an integral inner portion extending circumferentially throughout the inner side thereof which contacts with the rim, a tubular metallic lining in said portion, securing elements passing through the rim and engaging in said lining to fix the tube firmly in relation with the rim, said rim having flanges engaging the outer sides of the casing adjacent the edges thereof, and said lining forming a rigid spacer between said casing edges whereby said edges are clamped between said flanges.

3. A pneumatic tire air cell, comprising an annular tube, an annular non-deformable hollow frame within the tube having a flat side at the inner side of the tube which is permanently joined with the material of the tube and adapted to abut a supporting tire rim, and a valve stem secured to the frame and opening into the tube, said frame being covered exteriorly by an integral continuation of the material of the tube.

4. A pneumatic tire air cell, comprising an annular tube, an annular non-deformable hollow frame within the tube having a flat side at the inner side of the tube which is permanently joined with the material of the tube and adapted to abut a supporting tire rim, and a valve stem secured to the frame and opening into the tube, said frame being covered exteriorly by an integral continuation of the material of the tube, and said material being of increased thickness over the area of said frame which is directed radially outward of the tube to form a tread body.

5. A pneumatic tire assembly, comprising a rim having radially directed edge flanges and divided circumferentially to form two portions, one of which is adapted to receive the other, a tire casing having beaded edges, an inner tube for the casing, an annular frame of non-deformable character and of hollow formation within said tube, said frame having a flat inner side disposed adjacent the inner side of the tube and adapted to position against one of the portions of said rim, the frame further having side walls extending into the tube, said tube having the material thereof extending over the said inner side of the frame and formed to provide a recess at each side of the frame for the reception of a bead of the casing, said beads being compressed between the flanges of the rim and the non-deformable side walls of the frame when the rim sections are assembled, and securing elements passing through said rim sections and into the said inner side of the frame for maintaining the tire assembly.

6. A pneumatic tire inner tube comprising an annular tubular body, an annular tubular frame of non-deformable character disposed within the body and of substantially triangular cross-section, the basal portion of said triangular cross-section of the frame being disposed at the inner side of the tube with the apex directed radially outwardly thereof and normally being in the center part of the tube, the said tube having the material thereof extending over the exterior surface of the frame and thickened across the apex portion thereof to form a tread against which the tube contacts only when deflated, and a valve stem secured to the base portion of the frame and opening therethrough to the interior of the tube.

7. A pneumatic tire inner tube comprising an annular tubular body, an annular tubular frame disposed within the body and of substantially triangular cross-section, the basal portion of said triangular cross-section of the frame being disposed at the inner side of the tube with the apex directed radially outwardly thereof, the said tube having the material thereof extending over the exterior surface of the frame and thickened across the apex portion thereof, and a valve stem secured to the base portion of the frame and opening therethrough to the interior of the tube, said frame having portions struck inwardly from the opposite sides thereof, and having said in-struck portions of one side secured to those at the opposite side to form reinforcing struts across the frame.

8. A pneumatic tire assembly comprising a two-part rim, one of said parts being adapted to receive the other, a tire casing for the rim, a tube for said casing, an annular frame within the tube, said frame being of tubular construction and substantially triangular in cross-section, and having the basal portion of the section disposed upon the inner side of the tube to position adjacent the central portion of the rim, the tube of said material forming an integral covering for said frame, said frame at the base portion having thickened areas at spaced intervals each having a threaded aperture therein, said frame having spaced apertures for the extension of securing bolts through the two portions thereof into the threaded apertures of the frame, and means forming an air-tight seal between the material of the tube and the material of the annular frame adjacent each threaded aperture of said frame.

9. A pneumatic tire assembly comprising a two-part rim, one of said parts being adapted to receive the other, a tire casing for the rim, a tube for said casing, an annular frame within the tube, said frame being of tubular construction and substantially triangular in cross-section and having the basal portion of the section disposed upon the inner side of the tube to position adjacent the central portion of the rim, the tube of said material forming an integral covering for said frame, said frame at the base portion having thickened areas at spaced intervals each having a threaded aperture therein, said frame having spaced apertures for the extension of securing bolts through the two portions thereof into the threaded apertures of the frame, and an interiorly and exteriorly threaded sleeve closed at one end and having a lateral flange at its other end and threadably extended into each threaded aperture of the frame with the flange compressing the material of the tube against the adjacent portion of said frame, said sleeves being adapted to receive said securing bolts.

10. A pneumatic tire air cell comprising an annular hollow frame of non-deformable character and having a flat inner wall adapted to abut the outer face of a wheel rim, an annular tube encircling and partly enclosing said frame, said tube being joined to the frame along the sides of the latter and between the inner and outer circumferences thereof whereby an area is formed upon each side of the frame against which the edge beads of a tire casing may abut, and an air valve joined to the said inner wall of the frame and opening therethrough into the tube.

11. A pneumatic tire air cell comprising an annular hollow frame of substantially non-yielding material and having a flat inner wall adapted to abut the outer face of a wheel rim, an annular tube encircling and enclosing said frame, said tube being joined to the frame along the sides of the latter and between the inner and outer circumferences thereof whereby an area is formed upon each side of the frame against which the edge beads of a tire casing may abut, an air valve joined to the said inner wall of the frame and opening therethrough into the tube, and reinforcing webs joining the side walls of the frame and constituting portions of the material of the frame punched therefrom and turned inwardly and joined together.

12. A pneumatic tire inner tube comprising an annular tubular body, an annular tubular frame disposed within the body and of substantially triangular cross-section, the basal portion of said triangular cross-section of the frame being disposed at the inner side of the tube with the apex directed radially outwardly thereof, and a valve stem secured to the base portion of the frame and opening therethrough to the interior of the tube, said frame having portions struck inwardly from the opposite sides thereof and having said instruck portions of one side secured to those at the opposite side to form reinforcing struts across the frame.

13. A pneumatic tire inner tube comprising an annular tubular body, an annular tubular frame disposed partly within the body and of substantially triangular cross-section, the basal portion of said triangular cross-section of the frame lying within the inner circumference of the tubular body, the said tubular body joining the side walls of the frame, said basal portion of the annular frame being designed to position upon a wheel rim and having threaded apertures therethrough for the reception of securing bolts extending through the rim, sealing means for said threaded apertures in the form of dome-like bodies connected with the frame and lying within the same, and a valve stem secured to the base portion of the frame and opening therethrough to the interior of the tube.

JOHN B. RICKETTS, Jr.